(12) United States Patent
Akiyama (10) Patent No.: US 10,866,497 B2
(45) Date of Patent: Dec. 15, 2020

(54) WAVELENGTH CONVERSION DEVICE, LIGHT SOURCE DEVICE, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/337,833

(22) PCT Filed: Sep. 20, 2017

(86) PCT No.: PCT/JP2017/033811
§ 371 (c)(1),
(2) Date: Mar. 28, 2019

(87) PCT Pub. No.: WO2018/061897
PCT Pub. Date: Apr. 5, 2018

(65) Prior Publication Data
US 2019/0339600 A1 Nov. 7, 2019

(30) Foreign Application Priority Data
Sep. 29, 2016 (JP) ................. 2016-190773

(51) Int. Cl.
*G03B 21/20* (2006.01)
*G03B 21/16* (2006.01)
*G03B 33/12* (2006.01)
(52) U.S. Cl.
CPC ........... *G03B 21/204* (2013.01); *G03B 21/16* (2013.01); *G03B 33/12* (2013.01)

(58) Field of Classification Search
CPC ....... G03B 21/204; G03B 21/16; G03B 33/12
See application file for complete search history.

(56) References Cited

U.S. PATENT DOCUMENTS

2005/0094397 A1* 5/2005 Yamada ................. H04N 9/315
362/253
2007/0131954 A1* 6/2007 Murayama ............ H01L 33/648
257/98

(Continued)

FOREIGN PATENT DOCUMENTS

| JP | 2010-218840 A | 9/2010 |
|---|---|---|
| JP | 2014-123014 A | 7/2014 |

(Continued)

OTHER PUBLICATIONS

Nov. 21, 2017 International Search Report issued in International Patent Application No. PCT/JP2017/033811.

*Primary Examiner* — Michelle M Iacoletti
*Assistant Examiner* — Magda Cruz
(74) *Attorney, Agent, or Firm* — Oliff PLC (57) ABSTRACT

A wavelength conversion device includes a phosphor layer that is excited by excitation light to thereby emit light in a wavelength band different from a wavelength band of the excitation light, a base material that includes a first surface and holds the phosphor layer on the first surface, and a third lens disposed to be opposed to the phosphor layer. An opening section juxtaposed with the phosphor layer is provided on the first surface. A channel that causes the opening section and the outside of the wavelength conversion device to communicate is provided in the base material. The third lens includes an opposed surface opposed to the phosphor layer and the opening section.

18 Claims, 5 Drawing Sheets

(56) References Cited

U.S. PATENT DOCUMENTS

| | | | |
|---|---|---|---|
| 2014/0176915 A1 | 6/2014 | Yamamoto | |
| 2015/0042963 A1* | 2/2015 | Nishimori | G03B 21/16 |
| | | | 353/57 |
| 2016/0291315 A1* | 10/2016 | Hsu | G02B 26/008 |

FOREIGN PATENT DOCUMENTS

| | | | | |
|---|---|---|---|---|
| JP | 2015146008 A | * | 8/2015 | G03B 21/14 |
| JP | 2017-116629 A | | 6/2017 | |

* cited by examiner

WAVELENGTH CONVERSION DEVICE, LIGHT SOURCE DEVICE, AND PROJECTOR

BACKGROUND

1. Technical Field

The present invention relates to a wavelength conversion device, a light source device, and a projector.

2. Related Art

There has been known a projector that modulates, according to image information, light emitted from a light source device and projects an image on a projection surface such as a screen. In recent years, a light source device using a light emitting element such as a semiconductor laser and a phosphor has been proposed as a light source device of a projector or the like as described in JP-A-2014-123014.

The light source device described in Patent Literature 1 includes an excitation light source section that emits excitation light and a fluorescent-light emitting section. The fluorescent-light emitting section includes a phosphor plate including a phosphor layer, a substrate on which the phosphor plate is placed, a condensing lens that covers the phosphor plate, a lens holder that holds the condensing lens, and a heat sink. The phosphor plate is irradiated with the excitation light emitted from the excitation light source section and emits fluorescent light in a wavelength band different from a wavelength band of the excitation light. The phosphor plate is sealed by at least the substrate and the condensing lens.

SUMMARY OF INVENTION

Technical Problem

In recent years, a light source device that emits light having higher luminance has been demanded in order to enable projection of a brighter image. When light intensity of the excitation light is increased in order to emit the light having the higher luminance, since the temperature of the phosphor layer rises, it is necessary to improve a heat radiation property.

However, in the light source device described in Patent Literature 1, although the heat sink is provided in the fluorescent-light emitting section, it is considered difficult to sufficiently radiate heat of the phosphor layer that generates heat by being irradiated with the excitation light. When the heat radiation is insufficient and the heat generation of the phosphor layer becomes conspicuous, a phenomenon in which light emission efficiency is deteriorated (temperature quenching) occurs. Therefore, there is a problem in that it is difficult to emit light having high luminance and long-term reliability is deteriorated according to deterioration of the phosphor layer and the like due to a temperature rise.

SUMMARY

The present invention has been devised in order to solve at least a part of the problems described above and can be realized as the following forms or application examples.

APPLICATION EXAMPLE 1

A wavelength conversion device according to this application example is a wavelength conversion device including a wavelength conversion layer that is excited by excitation light to thereby emit light in a wavelength band different from a wavelength band of the excitation light, the wavelength conversion device including: a base material that includes a first surface and holds the wavelength conversion layer on the first surface; and a light transmitting member disposed to be opposed to the wavelength conversion layer. An opening section juxtaposed with the wavelength conversion layer is provided on the first surface. A channel that causes the opening section and an outside of the wavelength conversion device to communicate is provided in the base material. The light transmitting member includes an opposed surface opposed to the wavelength conversion layer and the opening section.

With this configuration, by circulating air in the channel of the base material, it is possible to cause the air to flow out from the opening section and change a flow of the air with the light transmitting member to cause the air to flow to the wavelength conversion layer. Accordingly, it is possible to provide the wavelength conversion device in which the wavelength conversion layer that generates heat by being excited by the excitation light and the base material are efficiently cooled and the temperature rise is prevented.

When dust adheres to the wavelength conversion layer, the dust is carbonized by the excitation light and further absorbs the excitation light to thereby further become a factor of the temperature rise. However, in the wavelength conversion device having this configuration, dust is prevented from adhering to the surface of the wavelength conversion layer by the base material and the light transmitting member. Therefore, it is possible to reduce the factor of the temperature rise.

Therefore, it is possible to provide the wavelength conversion device excellent in reliability while preventing a decrease in luminance. If a phosphor layer including a phosphor on the inside is used as the wavelength conversion layer, a phenomenon in which light emission efficiency is deteriorated (temperature quenching) according to a temperature rise of the phosphor is prevented. Therefore, it is possible to provide the wavelength conversion device that emits light having high luminance.

APPLICATION EXAMPLE 2

In the wavelength conversion device according to the application example described above, it is preferable that the light transmitting member is a lens, the opposed surface of which is formed as a concave surface.

With this configuration, since the opposed surface of the light transmitting member is formed as the concave surface, it is possible to more efficiently cause the air flowing out from the opening section to flow to the wavelength conversion layer. Since the light transmitting member is the lens, it is possible to guide the light emitted from the wavelength conversion layer to a predetermined direction. Accordingly, it is possible to provide the wavelength conversion device that emits light in the predetermined direction while more efficiently cooling the wavelength conversion layer.

APPLICATION EXAMPLE 3

In the wavelength conversion device according to the application example described above, it is preferable that the opening section includes first opening sections from which air flows out, and the first opening sections are provided on both sides via the wavelength conversion layer.

With this configuration, since the first opening sections are provided on both the sides via the wavelength conversion layer on the base material, flows of the air flowing out from the respective first opening sections collide with each other between the wavelength conversion layer and the light transmitting member. Consequently, it is possible to cause the air flowing out from the first opening sections to concentratedly flow to the wavelength conversion layer. Therefore, in the wavelength conversion device, the wavelength conversion layer is more efficiently cooled.

APPLICATION EXAMPLE 4

In the wavelength conversion device according to the application example described above, the opening section includes a second opening section into which air flows.

With this configuration, it is possible to cause the air flowing out from the first opening section and flowing into between the wavelength conversion layer and the light transmitting member to flow out to the outside of the wavelength conversion device from the second opening section.

Accordingly, it is possible to cause the air, which has cooled the wavelength conversion layer, to smoothly flow out to the outside of the wavelength conversion device. Therefore, it is possible to more efficiently cool the wavelength conversion layer and prevent dust adhesion.

APPLICATION EXAMPLE 5

In the wavelength conversion device according to the application example described above, it is preferable that the wavelength conversion device includes an annular member disposed between the first surface and the light transmitting member and surrounding the first opening sections, the second opening section, and the wavelength conversion layer, and the annular member is in close contact with the first surface and the light transmitting member.

With this configuration, the annular member surrounding the first opening sections, the second opening section, and the wavelength conversion layer and in close contact with the first surface and the light transmitting member is disposed between the base material and the light transmitting member. Consequently, by preventing dust from being included in the air caused to flow out from the first opening sections, it is possible to cool the wavelength conversion layer and it is possible to prevent intrusion of dust from the outside into a region surrounded by the annular member. Accordingly, it is possible to provide the wavelength conversion device in which dust adhesion to the wavelength conversion layer is further prevented, that is, a temperature rise involved in carbonization of the dust is further prevented.

APPLICATION EXAMPLE 6

In the wavelength conversion device according to the application example described above, it is preferable that the base material includes: a first member that includes the first surface and holds the wavelength conversion layer on the first surface; and a second member that includes the first surface and is provided on the wavelength conversion layer side with respect to the first member, a recessed section forming the channel is formed in the first member by providing the second member on the first member, and the opening section is formed by providing the second member on the first member.

With this configuration, since the second member is provided on the wavelength conversion layer side with respect to the first member including the recessed section, it is possible to configure the base material including the channel described above. Accordingly, even the configuration including the channel in the base material is easily machined. It is possible to provide the wavelength conversion device with an increase in manufacturing man hours prevented.

APPLICATION EXAMPLE 7

A light source device according to this application example includes: a light source that emits excitation light; and the wavelength conversion device described above on which the excitation light is made incident.

With this configuration, since the light source device includes the wavelength conversion device described above, the light source device is excellent in reliability and is capable of emitting light having high luminance.

APPLICATION EXAMPLE 8

A projector according to this application example includes: the light source device described above; a light modulation device that modulates, according to image information, light emitted from the light source device and generates image light; a projection optical device that projects the image light; and a blowing device that blows air to the wavelength conversion device.

With this configuration, since the projector includes the optical devices and the blowing device described above, it is possible to prevent a temperature rise of the wavelength conversion device. Accordingly, it is possible to provide the projector capable of projecting a bright image for a long period.

DESCRIPTION OF EXEMPLARY EMBODIMENTS

Embodiments of the present invention are explained below with reference to the drawings. A projector in an embodiment modulates, according to image information, light emitted from a light source and projects an image on a projection surface such as a screen. Note that, in the figures referred to below, dimensions and ratios of components are differentiated from actual ones as appropriate to show the components in sizes recognizable on the drawings.

First Embodiment

[Main Configuration of a Projector]

Figure 1:
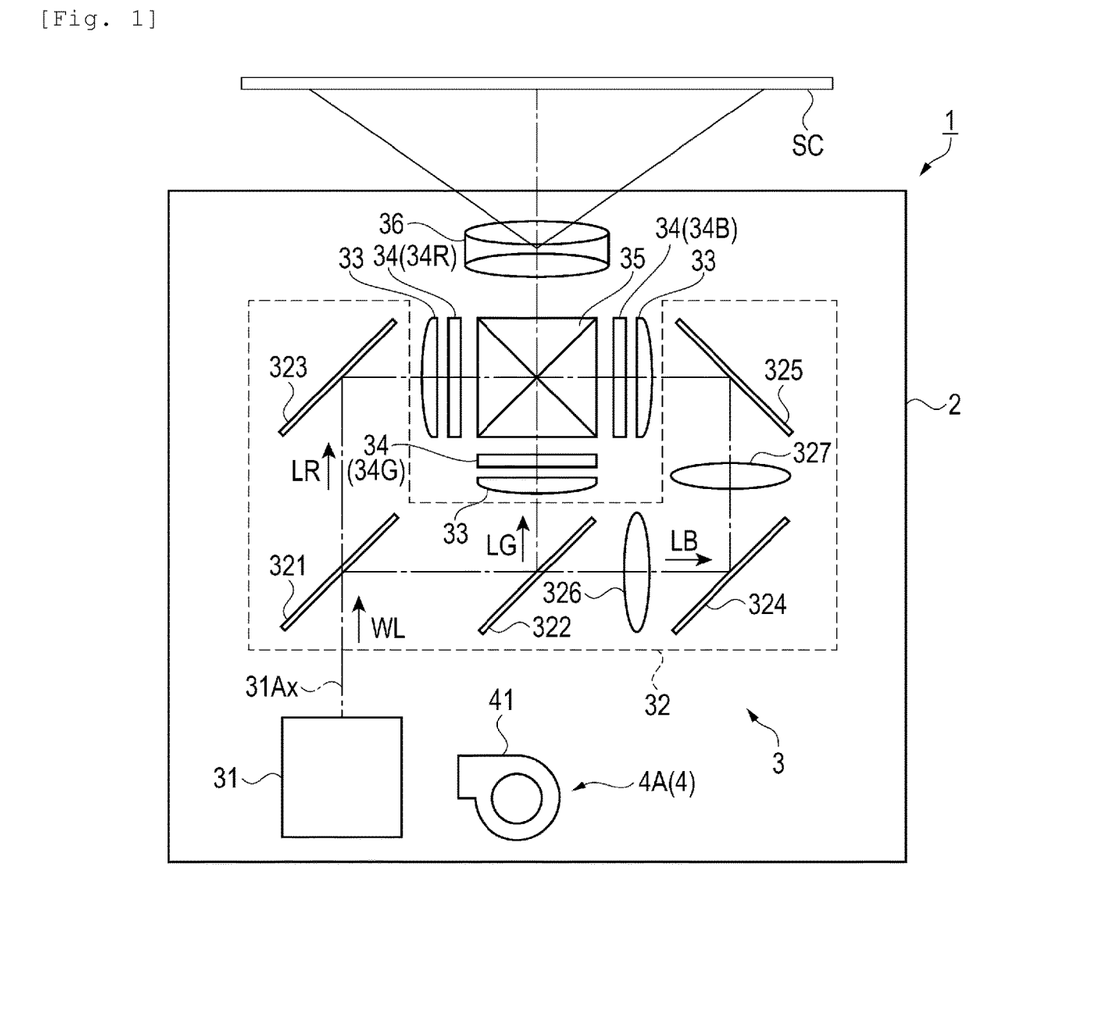
FIG. 1 is a schematic diagram showing a main configuration of a projector according to a first embodiment.

FIG. 1 is a schematic diagram showing a main configuration of a projector 1 according to an embodiment.

The projector 1 includes, as shown in FIG. 1, an exterior housing 2 and a control section (not shown in the figure), an optical unit 3, and a cooling device 4 housed in the exterior housing 2. Note that, although illustration is omitted, the projector 1 includes a power supply device that supplies electric power to electronic components.

The optical unit 3 includes, as shown in FIG. 1, an illumination device 31, a color separation optical system 32, collimating lenses 33, light modulation devices 34, a color synthesis optical device 35, and a projection optical device 36.

As explained in detail below, the illumination device 31 emits white light WL centering on an optical axis 31Ax.

The color separation optical system 32 includes dichroic mirrors 321 and 322, reflection mirrors 323, 324, and 325, and relay lenses 326 and 327. The color separation optical system 32 separates the white light WL emitted from the illumination device 31 into red light (LR), green light (LG), and blue light (LB).

The relay lenses 326 and 327 are disposed on an optical path post-stage side of the dichroic mirror 322. The relay lenses 326 and 327 have a function of compensating for an optical loss of the blue light LB caused because an optical path length of the blue light LB is longer than an optical path length of the red light LR and the green light LG.

The collimating lenses 33 are respectively provided for the color lights and collimate the color lights made incident thereon.

The light modulation devices 34 are respectively provided for the color lights (the light modulation devices for LR, LG, and LB are respectively represented as 34R, 34G, and 34B). The light modulation devices 34R, 34G, and 34B respectively include liquid crystal panels and pairs of polarizing plates disposed on light incident sides and light emission sides of the liquid crystal panels. The light modulation devices 34 include rectangular image formation regions (not shown in the figure) in which not-shown pluralities of micro pixels are formed in matrix shapes. The light modulation devices 34 modulate the color lights (LR, LG, and LB) made incident thereon according to image information and generate image lights.

The color synthesis optical device 35 includes a cross dichroic prism and combines the color lights modulated by the light modulation devices 34R, 34G, and 34B.

The projection optical device 36 includes a lens barrel and a plurality of lenses (neither of which is shown in the figure) and projects image light synthesized by the color synthesis optical device 35 onto a projection surface SC. Consequently, an enlarged color image is displayed on the projection surface SC.

The cooling device 4 includes a first cooling device 4A that cools the illumination device 31. The first cooling device 4A includes a blowing fan 41 that blows air to a wavelength conversion device 5 explained below of the illumination device 31 and a duct member (not shown in the figure) that guides the air to the wavelength conversion device 5. The blowing fan 41 is equivalent to the blowing device. Note that, although illustration is omitted, the cooling device 4 includes a second cooling device that cools the optical modulation device 34 and the like and an exhaust device that exhausts warmed air in the exterior housing 2 to the outside.

[Main Configuration of the Illumination Device]

Figure 2:
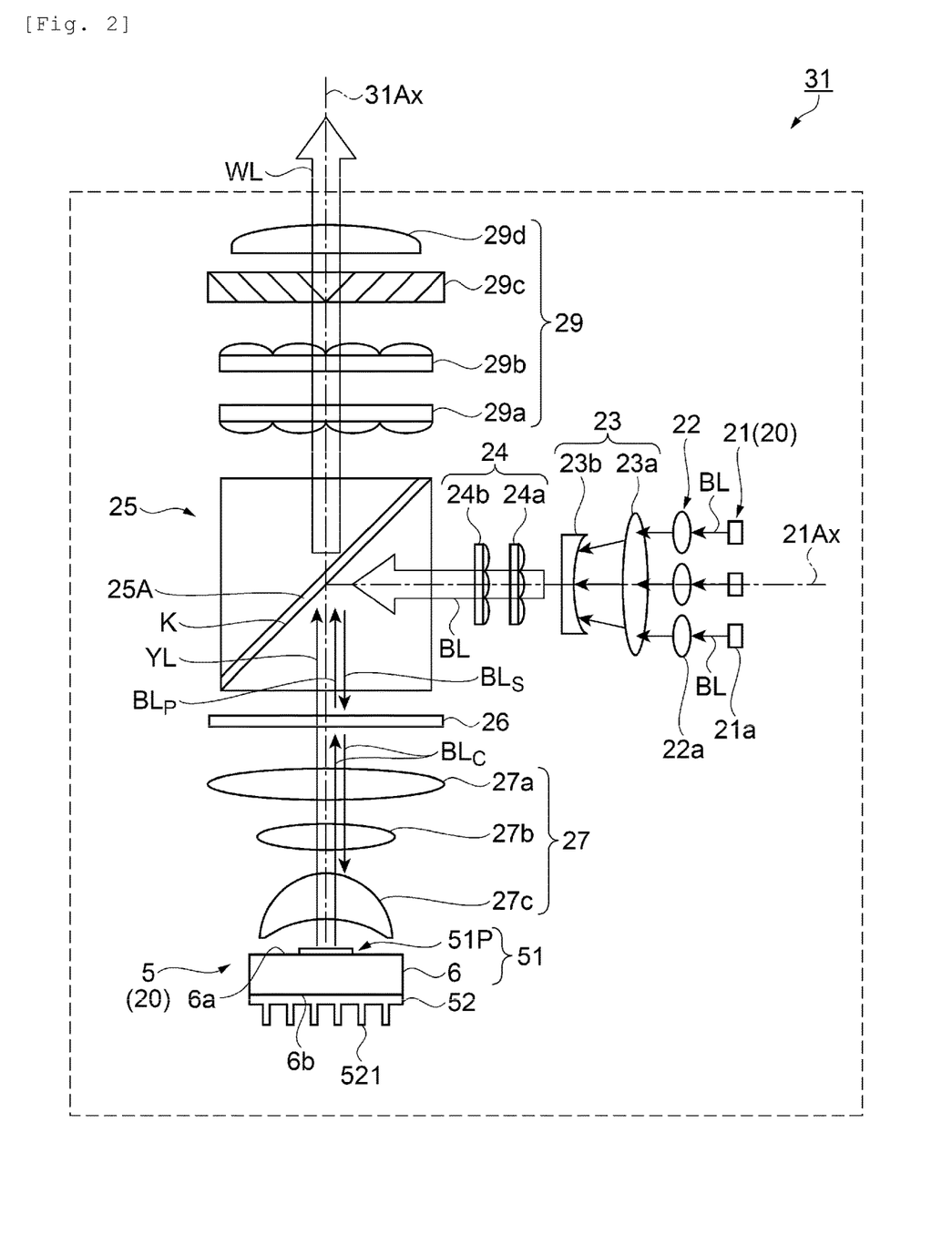
FIG. 2 is a schematic diagram showing the configuration of an illumination device in the first embodiment.

FIG. 2 is a schematic diagram showing the configuration of the illumination device 31.

The illumination device 31 includes, as shown in FIG. 2, a light source 21, a collimator optical system 22, an afocal optical system 23, a homogenizer optical system 24, an optical element 25, a phase difference plate 26, a pickup optical system 27, a wavelength conversion element 51, a heat sink 52, and an integrator optical system 29.

The light source 21 is configured by arraying a plurality of semiconductor lasers 21a in a matrix shape. The light source emits light centering on an optical axis 21Ax. The semiconductor lasers 21a emit, for example, blue lights BL (excitation lights) having a peak wavelength in a wavelength band of 440 to 480 nm. Note that, in this embodiment, the blue lights BL emitted from the semiconductor lasers 21a are S-polarized lights with respect to the optical element 25.

The collimator optical system 22 includes, for example, a plurality of collimator lenses 22a disposed to individually correspond to the semiconductor lasers 21a and collimates the blue light BL emitted from the light source 21.

The afocal optical system 23 includes, for example, afocal lenses 23a and 23b and adjusts the size (the light beam width) of the blue light BL emitted from the collimator optical system 22.

The homogenizer optical system 24 includes, for example, a pair of multi-lens arrays 24a and 24b and converts a light intensity distribution of the blue light BL emitted from the afocal optical system 23 into a uniform state.

The optical element 25 is formed in a substantially rectangular parallelepiped shape by sticking together, on an interface K, two prisms formed in a substantially triangle pole shape. A polarization separation element 25A having wavelength selectivity is provided on the interface K. The optical element 25 is disposed such that the interface K forms an angle of 45° with respect to the respective optical axes 21Ax and 31Ax and an intersection of the optical axes 21Ax and 31Ax orthogonal to each other and the optical center of the interface K substantially coincide with each other.

The polarization separation element 25A has wavelength selectivity (a polarization separation characteristic) for separating S-polarized light and P-polarized light of light in a predetermined wavelength band but transmitting S-polarized light and P-polarized light of light in another predetermined wavelength band. Specifically, the polarization separation element 25A reflects S-polarized light of the blue light BL and transmits P-polarized light of the blue light BL. The polarization separation element 25A transmits yellow light YL emitted from the wavelength conversion element 51 irrespective of a polarization state. Note that the optical element 25 is not limited to an optical element having a prism shape and may be an optical element in which a flat dichroic mirror is used.

The blue light BL emitted from the homogenizer optical system 24 and made incident on the polarization separation element 25A is the S-polarized light. Therefore, the blue light BL is reflected on the polarization separation element 25A and emitted as blue light BLs (excitation light).

The phase difference plate 26 is a ¼ wavelength plate (a λ/4 plate). The phase difference plate 26 converts the blue light BLs (the excitation light), which is the S-polarized light, reflected on the polarization separation element 25A into blue light BLc (excitation light), which is a circularly polarized light.

The pickup optical system 27 includes, for example, a first lens 27a, a second lens 27b, and a third lens 27c disposed in order from the phase difference plate 26 side. The pickup optical system 27 condenses the blue light BLc (the excitation light) emitted from the phase difference plate 26 toward a phosphor layer 51P explained below of the wavelength conversion element 51.

The wavelength conversion element 51 includes a phosphor layer 51P functioning as a wavelength conversion layer and a base material 6. The wavelength conversion element 51 is configured not to rotate. The base material 6 includes a first surface 6a on the third lens 27c side and a second surface 6b on the opposite side of the first surface 6a. The phosphor layer 51P is held on the first surface 6a and jointed to the first surface 6a by a not-shown joining member. The third lens 27c is equivalent to the light transmitting member disposed to be opposed to the phosphor layer 51P.

The phosphor layer 51P is formed by containing a phosphor (e.g., a YAG phosphor $(Y, Gd)_3 (Al, Ga)_5 O_{12}:Ce$) in an inorganic binder such as alumina. Note that a material forming a phosphor particle may be one kind. A material obtained by mixing particles formed using two or more kinds of materials may be used. The phosphor layer 51P in this embodiment is formed at thickness of, for example, 0.05 mm to 0.2 mm. However, the thickness is not limited to this numerical value. Note that the phosphor layer 51P may be a phosphor layer obtained by sintering a phosphor without using the inorganic binder.

The phosphor is excited by the blue light BLs (the excitation light) condensed by the pickup optical system 27 and emits fluorescent light (yellow light YL including green light and red light, for example, light having a peak wavelength in a wavelength region of 500 to 700 nm), which is a nonpolarized light. In this way, the phosphor layer 51P is excited by the excitation light to thereby emit light in a wavelength band different from a wavelength band of the excitation light.

A reflection film is provided between a surface opposed to the first surface 6a of the phosphor layer 51P and the first surface 6a. The phosphor layer 51P is formed to reflect a part of the blue light BLc (the excitation light) made incident thereon. That is, the yellow light YL excited by the blue light BLc (the excitation light) and the blue light BLc are emitted from the wavelength conversion element 51.

The heat sink 52 includes a plurality of fins 521 and is disposed on the second surface 6b side of the base material 6. The heat sink 52 radiates heat of the phosphor layer 51P, which generates heat by irradiation of the blue light BLc (the excitation light), via the base material 6. The heat of the heat sink 52 is radiated by the air blown from the blowing fan 41. Note that the plurality of fins 521 are formed to extend along a flow of the air blown from the blowing fan 41. However, among the drawings showing the heat sink 52, to facilitate recognition of the plurality of fins 521, some drawings show the plurality of fins 521 not to extend along the flow of the air.

As explained in detail below, channels 6Fa (see FIG. 3) in which the air blown from the blowing fan 41 circulates are provided in the base material 6. The phosphor layer 51P is cooled by, in addition to the heat radiation by the heat sink 52, a flow of the air, which flows in the channels 6Fa, generated using the third lens 27c. The wavelength conversion element 51, the heat sink 52, and the third lens 27c are equivalent to the wavelength conversion device 5. The wavelength conversion device 5 is explained in detail below. The light source 21 and the wavelength conversion device 5 are equivalent to a light source device 20.

The yellow light YL emitted from the wavelength conversion element 51 passes through the pickup optical system 27 and the phase difference plate 26. At this time, since the yellow light YL is a light beam, polarization directions of which are not aligned, even after passing through the phase difference plate 26, the yellow light YL is made incident on the polarization separation element 25A while keeping a state in which the polarization directions are not aligned. The yellow light YL passes through the polarization separation element 25A.

On the other hand, the blue light BLc reflected or back-scattered on the wavelength conversion element 51 passes through the pickup optical system 27 and the phase difference plate 26 again. The blue light BLc passes through the phase difference plate 26 to thereby be converted from the circularly polarized light into blue light BLp, which is P-polarized light. The blue light BLp is transmitted through the polarization separation element 25A. Note that a polarization state of a part of the blue light reflected or back-scattered on the wavelength conversion element 51 is disturbed. Some components of the blue light are not converted into P-polarized light after passing through the phase difference plate 26. Light of this component (S-polarized light component) returns to the light source 21 side.

The yellow light YL and the blue light BLp transmitted through the polarization separation element 25A are combined and emitted to the integrator optical system 29 as the white light WL.

The integrator optical system 29 includes a first lens array 29a, a second lens array 29b, a polarization conversion element 29c, and a superimposing lens 29d. The integrator optical system 29 substantially uniformizes an illuminance distribution of the white light WL emitted from the optical element 25 in the image formation regions of the light modulation devices 34 (34R, 34G, and 34B).

Specifically, the first lens array 29a includes a plurality of small lenses arrayed in a matrix shape on a surface crossing the optical axis 31Ax. The first lens array 29a divides the white light WL made incident thereon into a plurality of partial light beams.

Like the first lens array 29a, the second lens array 29b includes a plurality of small lenses arrayed in a matrix shape. The second lens array 29b superimposes a plurality of partial light beams divided by the small lenses on the image formation regions of the light modulation devices 34 in conjunction with the superimposing lens 29d.

The polarization conversion element 29c is disposed between the second lens array 29b and the superimposing lens 29d. The polarization conversion element 29c aligns polarization directions of the plurality of partial light beams made incident thereon.

[Configuration of the Wavelength Conversion Device]

The wavelength conversion device 5 is explained in detail.

Figure 3:
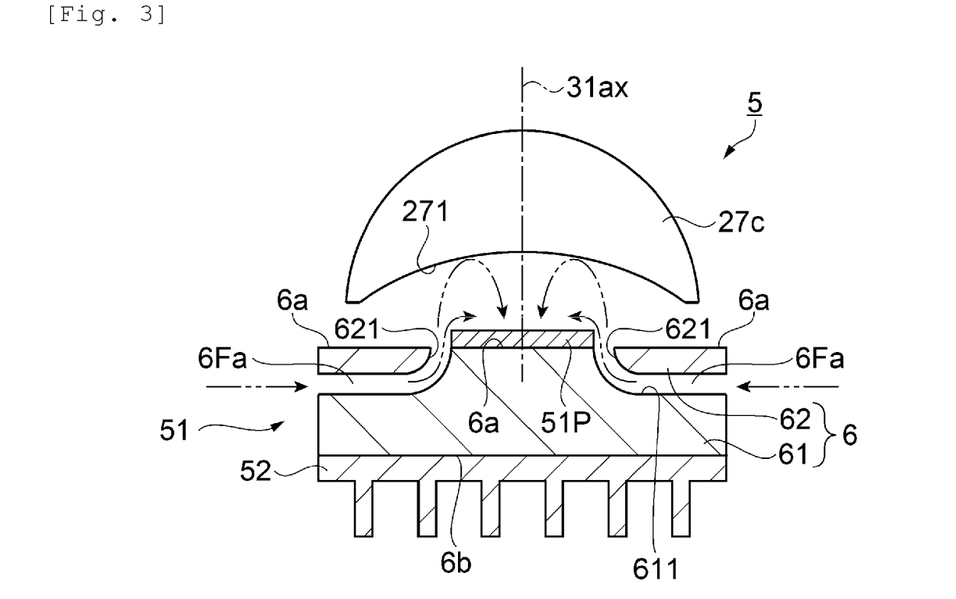
FIG. 3 is a sectional view schematically showing the configuration of a wavelength conversion device in the first embodiment.

The wavelength conversion device 5 includes, as explained above, the wavelength conversion element 51, the heat sink 52, and the third lens 27c.

Figure 4:
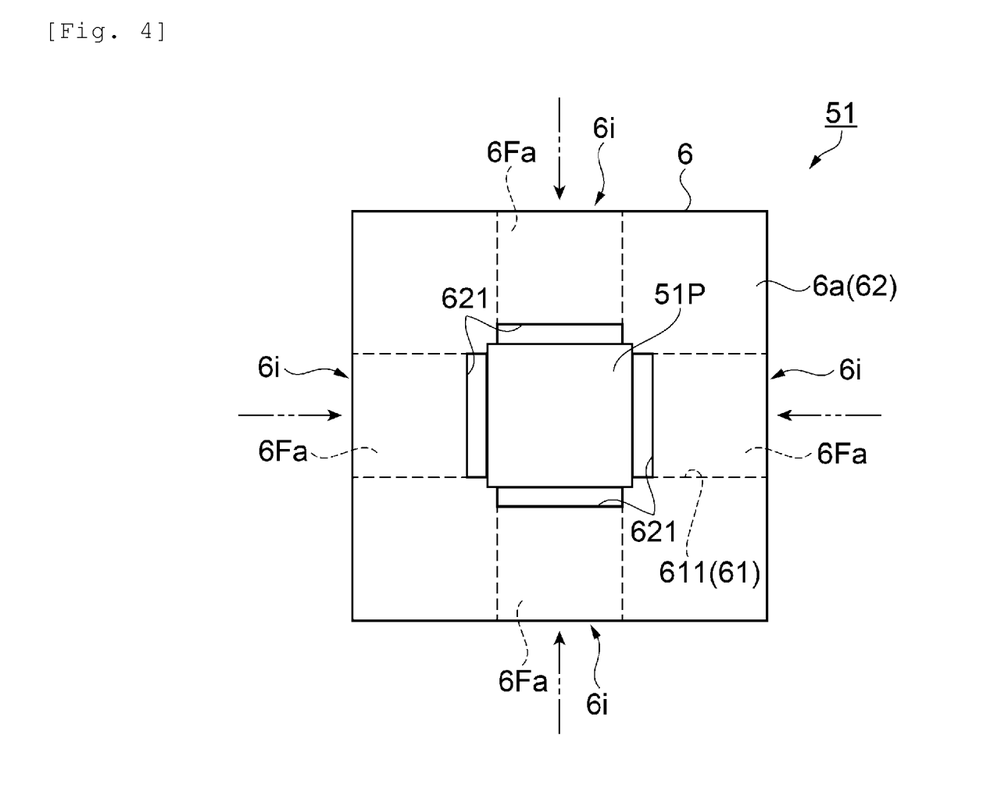
FIG. 4 is a plan view schematically showing a wavelength conversion element in the first embodiment.

FIG. 3 is a sectional view schematically showing the configuration of the wavelength conversion device 5. FIG. 4 is a plan view schematically showing the wavelength conversion element 51 and is a view of the wavelength conversion element 51 viewed from the third lens 27c side.

As shown in FIG. 4, the base material 6 of the wavelength conversion element 51 is formed in a rectangular shape in plan view. The phosphor layer 51P is formed in a rectangular shape in plan view and disposed in the center of the base material 6. The phosphor layer 51P is formed such that one side of the rectangular shape faces the same direction as the direction of one side of the base material 6 having the rectangular shape. The phosphor layer 51P in this embodiment is formed in a size of one side of, for example, 1 mm to 2 mm. However, the size of one side is not limited to this numerical value.

The base material 6 includes, as shown in FIG. 3, a first member 61 that forms the opposite side of the first surface 6a, that is, the second surface 6b side and holds the phosphor layer 51P on the first surface 6a and a tabular second member 62 including the first surface 6a and provided on the phosphor layer 51P side with respect to the first member 61.

The first member 61 and the second member 62 are formed of metal (e.g., copper or silver) having high thermal conductivity, ceramics, or the like.

On the first surface 6a of the second member 62, an opening section for exposing the phosphor layer 51P and a plurality of opening sections 621 juxtaposed with the phosphor layer 51P are formed. That is, the phosphor layer 51P is provided on the first member 61. A part of the first member 61 where the phosphor layer 51P is provided is the first surface 6a. As shown in FIG. 4, the opening sections 621 are provided on the outer sides of the respective four sides of the rectangular phosphor layer 51P. That is, the opening sections 621 are respectively provided on the left and the right and above and below the phosphor layer 51P in a plan view. In other words, the opening sections 621 are provided on both sides via the phosphor layer 51P in two directions of the left-right direction and the up-down direction in the plan view.

In the first member 61, as shown in FIG. 3, a plurality of recessed sections 611 where the first surface 6a is recessed to the second surface 6b side are formed. As shown in FIG. 4, the recessed sections 611 extend from positions along the sides of the rectangular phosphor layer 51P to end faces of the first member 61. The second member 62 is provided on the phosphor layer 51P side of the first member 61, whereby the recessed sections 611 form the channels 6Fa. The second member 62 is provided on the phosphor layer 51P side of the first member 61 to thereby form the opening sections 621.

In the base material 6, opening sections (inflow ports 6i) are respectively provided on four end faces. The opening sections 621 and the inflow ports 6i of the opening sections 621 are caused to communicate with each other. The inflow ports 6i are opening sections into which the air blown from the blowing fan 41 flows. The opening sections 621 are equivalent to the first opening sections from which the air flows out. The air flowing in from the inflow ports 6i flows out from the opening sections 621. In this way, the channels 6Fa cause the opening sections 621 and the outside of the wavelength conversion device 5 to communicate.

The third lens 27c includes, as shown in FIG. 3, an opposed surface 271 opposed to the phosphor layer 51P and the plurality of opening sections 621. The third lens 27c in this embodiment is a meniscus lens, the opposed surface 271 of which is formed as a concave surface recessed to the opposite side of the phosphor layer 51P.

Fluorescent light emitted from the phosphor layer 51P is diverging light, roughly 98% of which diverges within approximately 80° with respect to the center (the optical axis 31Ax) of the phosphor layer 51P. Therefore, in the third lens 27c in this embodiment, a concave surface shape of the opposed surface 271 is formed such that the diverging light within approximately 80° is made incident on the opposed surface 271. Reflection preventing treatment such as an AR (Anti Reflect) coat film is applied to the opposed surface 271. Consequently, the light emitted from the phosphor layer 51P is efficiently made incident on the third lens 27c.

A flow of the air blown from the blowing fan 41 to the wavelength conversion device 5 is explained.

The air blown from the blowing fan 41 is guided to a not-shown duct member. As shown in FIG. 4, the air flows into the channels 6Fa from the inflow ports 6i. As shown in FIG. 3, the air circulated in the channels 6Fa flows out from the opening sections 621.

Most of the air flowing out from the opening sections 621 flows to the third lens 27c. A part of the air flows to the phosphor layer 51P.

The air flowing to the third lens 27c collides with the opposed surface 271 and the direction of the flow is changed. The air flows to the phosphor layer 51P side. Since the opposed surface 271 is formed as the concave surface recessed to the opposite side of the phosphor layer 51P, the air colliding with the opposed surface 271 is prevented from dispersing in a direction parallel to the surface of the phosphor layer 51P. The air flows in a direction inclining further to the phosphor layer 51P side than this direction. Further, parts of the air flowing out from the opening sections 621 collide with one another. Therefore, the air concentratedly flows toward the phosphor layer 51P.

The air, which has cooled the phosphor layer 51P, flows out to the outside of the wavelength conversion device 5 from between the first surface 6a and the third lens 27c. The air is discharged to the outside of the exterior housing 2 by a not-shown exhaust device.

In this way, the air from the blowing fan 41 efficiently flows toward the phosphor layer 51P, cools the phosphor layer 51P and the base material 6, and prevents adhesion of dust to the surface of the phosphor layer 51P.

As explained above, according to this embodiment, the following effects can be obtained.

(1) The wavelength conversion device 5 is configured such that the air flowing in from the outside efficiently flows toward the phosphor layer 51P. Consequently, the phosphor layer 51P and the base material 6 that generate heat by being excited by the excitation light are efficiently cooled. It is possible to provide the wavelength conversion device 5 in which a temperature rise is prevented.

Since dust is prevented from adhering to the surface of the phosphor layer 51P, it is possible to reduce factors of a temperature rise involved in carbonization of the dust.

Therefore, it is possible to provide the wavelength conversion device 5 excellent in reliability while preventing a decrease in luminance. Since the temperature quenching of the phosphor is prevented, it is possible to provide the wavelength conversion device 5 that emits light having high luminance.

(2) Since the opposed surface 271 is formed as the concave surface recessed to the opposite side of the phosphor layer 51P, it is possible to cause the air flowing out from the opening sections 621 to more efficiently flow to the phosphor layer 51P. Since the light transmitting member disposed to be opposed to the phosphor layer 51P is the lens (the third lens 27c), the light emitted from the phosphor layer 51P can be guided in a predetermined direction. Accordingly, it is possible to provide the wavelength conversion device 5 that emits light in the predetermined direction while more efficiently cooling the phosphor layer 51P.

(3) Since the first opening sections (the opening sections 621) are respectively provided on both the sides via the phosphor layer 51P, the flows of the air respectively flowing out from the first opening sections collide with each other between the phosphor layer 51P and the light transmitting member. Consequently, it is possible to cause the air flowing out from the first opening sections to concentratedly flow to the phosphor layer 51P. Therefore, in the wavelength conversion device 5, the phosphor layer 51P is more efficiently cooled.

(4) On the first member 61 including the recessed sections 611, the second member 62 is provided on the side of the first member 61 where the phosphor layer 51P is provided. Consequently, the base material 6 including the channels 6Fa can be configured. Accordingly, even the configuration including the channels 6Fa in the base material 6 is easily machined. It is possible to provide the wavelength conversion device 5 with an increase in manufacturing manhours prevented.

(5) Since the light source device 20 includes the wavelength conversion device 5, the light source device 20 is excellent in reliability and is capable of emitting light having high luminance.

Since the projector 1 includes the light source device 20 including the wavelength conversion device 5 and the blowing fan 41, it is possible to prevent a temperature rise of the wavelength conversion device 5. Accordingly, it is possible to provide the projector 1 capable of projecting a bright image for a long period.

(7) In the wavelength conversion device 5, since the wavelength conversion element 51 is configured not to rotate, a reduction in size, a reduction in weight, and a reduction in cost are possible compared with a configuration in which the wavelength conversion element 51 rotates. Since a device that rotates the wavelength conversion element 51 is unnecessary, a reduction in the size and a reduction in the weight of the projector 1 are possible.

Second Embodiment

A wavelength conversion device 7 according to a second embodiment is explained below with reference to the drawings. In the following explanation, the same components as the components in the first embodiment are denoted by the same reference numerals and signs. Detailed explanation of the components is omitted or simplified.

Figure 5:
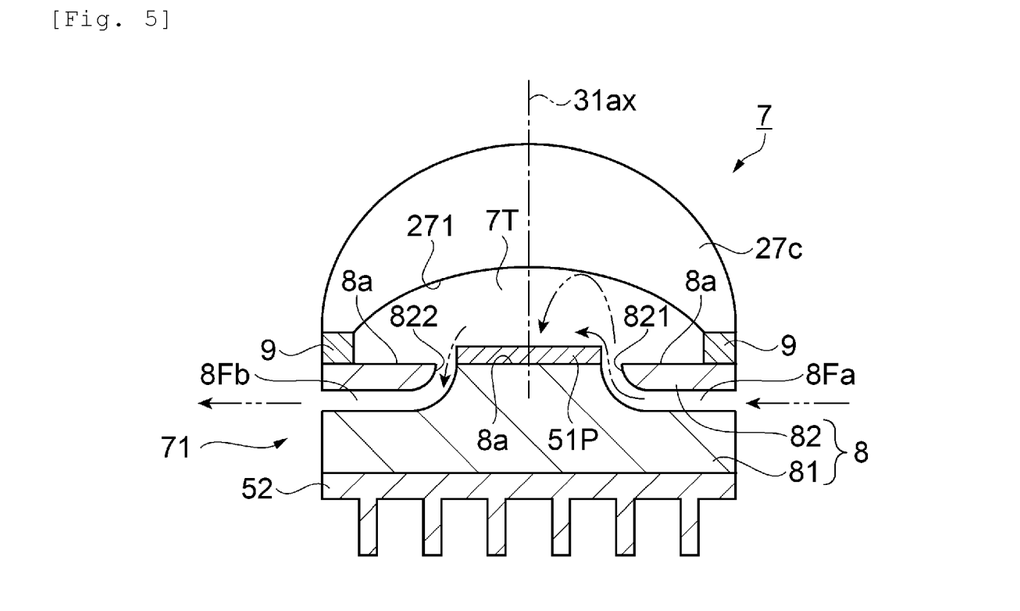
FIG. 5 is a sectional view schematically showing the configuration of a wavelength conversion device in a second embodiment.

FIG. 5 is a sectional view schematically showing the configuration of the wavelength conversion device 7 in this embodiment.

As shown in FIG. 5, the wavelength conversion device 7 in this embodiment includes a wavelength conversion element 71 different from the wavelength conversion element 51 in the first embodiment and includes an annular member 9 not included in the wavelength conversion device 5 (see FIG. 3) in the first embodiment.

The wavelength conversion element 71 includes a base material 8 different from the base material 6 in the first embodiment.

Like the base material 6 in the first embodiment, the base material 8 includes a first member 81 that forms the opposite side of a first surface 8a and holds the phosphor layer 51P on the first surface 8a and a tabular second member 82 including the first surface 8a on the third lens 27c side and provided on the phosphor layer 51P side with respect to the first member 81.

On the first surface 8a of the second member 82, an opening section for exposing the phosphor layer 51P and opening sections 821 and 822 juxtaposed with the phosphor layer 51P are formed. That is, the phosphor layer 51P is provided in the first member 81. A part of the first member 81 where the phosphor layer 51P is provided is the first surface 8a.

Figure 6:
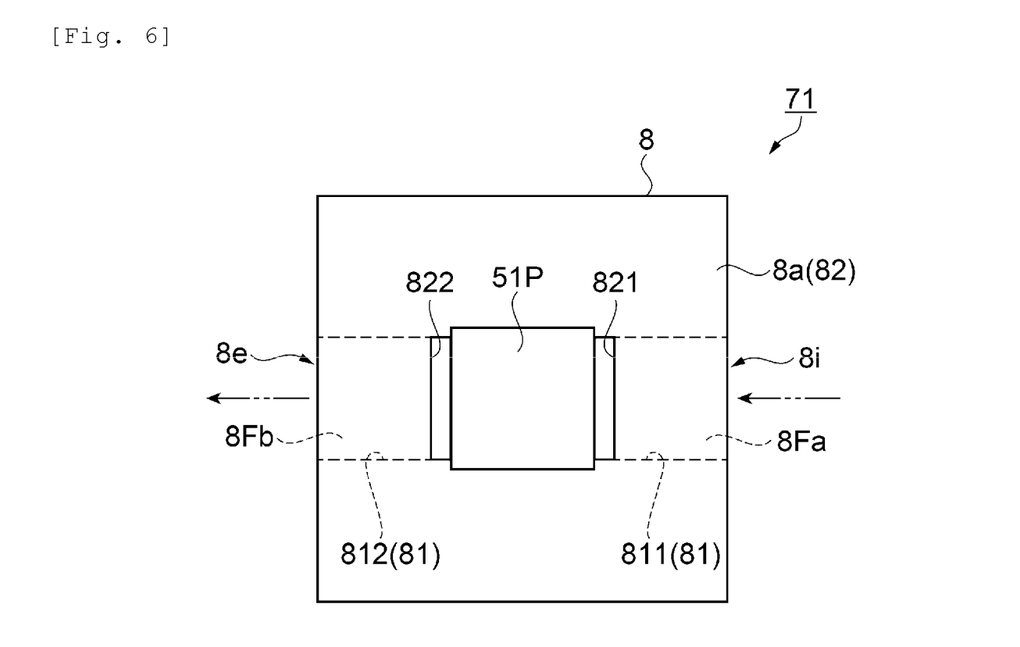
FIG. 6 is a plan view schematically showing a wavelength conversion element in the second embodiment.

FIG. 6 is a plan view schematically showing the wavelength conversion element 71 in this embodiment.

As shown in FIG. 6, the opening section 821 is provided on the outer side of one side among four sides of the rectangular phosphor layer 51P. The opening section 822 is provided on the opposite side of the opening section 821 of the phosphor layer 51P.

In the first member 81, recessed sections 811 and 812 forming channels 8Fa and 8Fb in conjunction with the second member 82 are formed. The recessed section 811 is provided to correspond to the opening section 821. The recessed section 811 extends from a position along a side of the rectangular phosphor layer 51P to an end face. The recessed section 812 is provided to correspond to the opening section 822. The recessed section 812 extends from a position along a side of the rectangular phosphor layer 51P to an end face.

In the base material 8, an opening section (an inflow port 8i) is provided on the end face on a side where the recessed section 812 is formed and an opening section (an outflow port 8e) is provided on the end face on a side where the recessed section 82 is formed.

The inflow port 8i is an opening section into which air blown from the blowing fan 41 flows. The opening section 821 is equivalent to the first opening section from which the air flows out. The air flowing in from the inflow port 8i flows out from the opening section 821. The opening section 822 is equivalent to the second opening section into which the air flows. The air between the first surface 8a and the third lens 27c flows into the opening section 822. The outflow port 8e is an opening section from which the air flowing in from the opening section 822 flows out. In this way, the channel 8Fa causes the opening section 821 and the outside of the wavelength conversion device 5 to communicate. The channel 8Fb causes the opening section 822 and the outside of the wavelength conversion device 5 to communicate.

As shown in FIG. 5, the annular member 9 is formed in an annular shape surrounding the opening sections 821 and 822 and the phosphor layer 51P and is disposed between the first surface 8a and the third lens 27c. The annular member 9 is disposed in close contact with the first surface 8a and the third lens 27c. The "close contact" means that the annular member 9 is in contact with the first surface 8a and the third lens 27c without gaps and the annular member 9 is fixed to the first surface 8a and the third lens 27c via an adhesive or the like. In this way, in the wavelength conversion device 7, a region 7T on the inner side of the annular member 9 surrounding the opening section 821 (the first opening section), the opening section 822 (the second opening section), and the phosphor layer 51P is sealed excluding the opening section 821 (the first opening section) and the opening section 822 (the second opening section) between the base material 8 and the third lens 27c.

A flow of the air blown from the blowing fan 41 to the wavelength conversion device 7 is explained.

The air blown from the blowing fan 41 is guided to a not-shown duct member. As shown in FIG. 5 and FIG. 6, the air flows into the channel 8Fa from the inflow port 8i. Although detailed explanation is omitted, dust is prevented from being included in the air flowing into the channel 8Fa.

The air circulated in the channel 8Fa flows out from the opening section 821.

Most of the air flowing out from the opening section 821 flows to the third lens 27c. A part of the air flows to the phosphor layer 51P.

The air flowing to the third lens 27c collides with the opposed surface 271 and the direction of the flow is changed. The air flows to the phosphor layer 51P side. Since the opposed surface 271 is formed as the concave surface recessed to the opposite side of the phosphor layer 51P, the air colliding with the opposed surface 271 is prevented from dispersing in a direction parallel to the surface of the phosphor layer 51P. The air flows in a direction inclining further to the phosphor layer 51P side than this direction.

The air, which has cooled the phosphor layer 51P, flows into the channel 8Fb from the opening section 822 and flows out to the outside of the wavelength conversion device 7 from the outflow port 8e. The air flowing out to the outside of the wavelength conversion device 7 is discharged to the outside of the exterior housing 2 by a not-shown exhaust device.

In this way, the wavelength conversion device 7 includes the channel 8Fb from which the air flows out from the inside to the outside in addition to the channel 8Fa into which the air on the outside flows. The wavelength conversion device 7 has a sealed structure.

As explained above, according to this embodiment, the following effects can be obtained.

The region 7T between the base material 8 and the third lens 27c is sealed excluding the opening sections 821 and 822. Dust is prevented from being included in the air flowing out from the opening section 821 (the first opening section). Consequently, it is possible to cool the phosphor layer 51P and it is possible to prevent intrusion of dust from the outside of the wavelength conversion device 7 into the region 7T. Accordingly, it is possible to provide the wavelength conversion device 7 in which dust adhesion to the phosphor layer 51P is further prevented, that is, a temperature rise involved in carbonization of the dust is further prevented.

Note that the present invention is not limited to the embodiment explained above. Various changes, improvements, and the like can be added to the embodiments. Modifications are explained below.

Modification 1

In the wavelength conversion devices 5 and 7 in the embodiments, the third lens 27c configured by the meniscus lens is used as the light transmitting member disposed to be opposed to the phosphor layer 51P. However, the third lens 27c may be a lens other than the meniscus lens. The third lens 27c may be a lens, an opposed surface of which opposed to the phosphor layer 51P is formed by a surface other than the concave surface.

A member other than the lens, for example, a tabular member, an opposed surface of which is formed flat, may be used as the light transmitting member.

Modification 2

In the first embodiment, the four opening sections 621 are provided as the first opening sections from which the air flows. However, the number of the provided first opening sections may be other than four.

In the first embodiment, one first opening section (the opening section 621) is provided to correspond to one side of the phosphor layer 51P. However, a plurality of first opening sections may be disposed to correspond to one side of the phosphor layer 51P.

Figure 7:
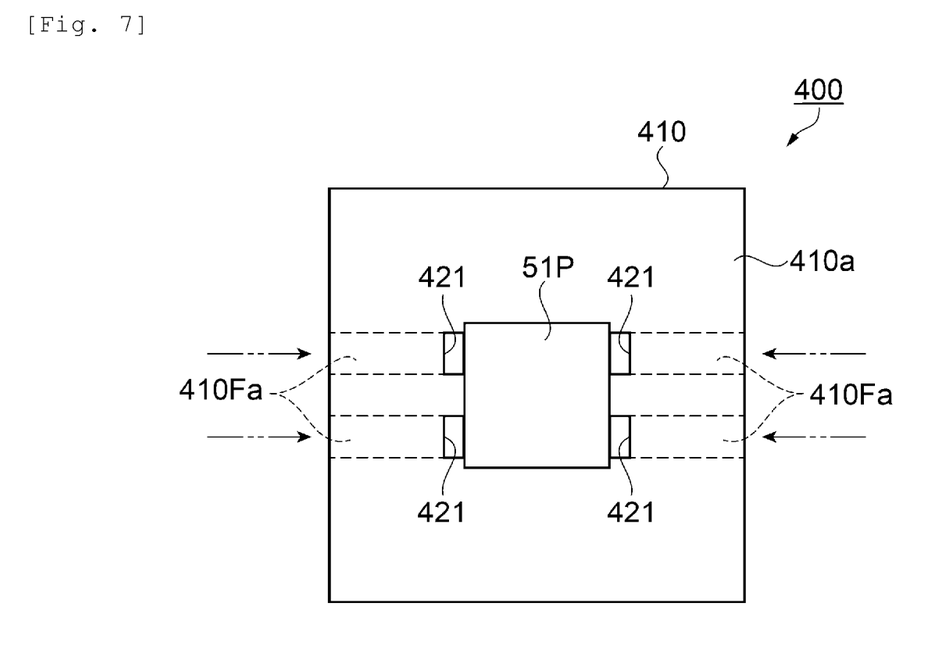
FIG. 7 is a schematic diagram of a wavelength conversion element showing an example of a modification.

FIG. 7 is a schematic diagram of a wavelength conversion element 400 showing an example of this modification.

As shown in FIG. 7, the wavelength conversion element 400 includes a base material 410. Two opening sections 421 are provided on each of both sides via the phosphor layer 51P on a first surface 410a that holds the phosphor layer 51P. The opening sections 421 are equivalent to the first opening sections from which the air flows out. Channels 410Fa that cause the opening sections 421 and the outside of the wavelength conversion device are formed in the base material 410. The air caused to flow into the channels 410Fa flows out from the opening sections 421 and cools the phosphor layer 51P as in the first embodiment.

Modification 3

In the first embodiment, the opening sections 621 and the inflow port 6i are formed in a one-to-one relation, that is, the same numbers of the first openings (the opening sections 621) and the inflow ports 6i are formed. However, the numbers of the opening sections 621 and the inflow ports 6i may be different. That is, channels that cause the first opening sections and the outside of the wavelength conversion device to communicate may branch.

Figure 8:
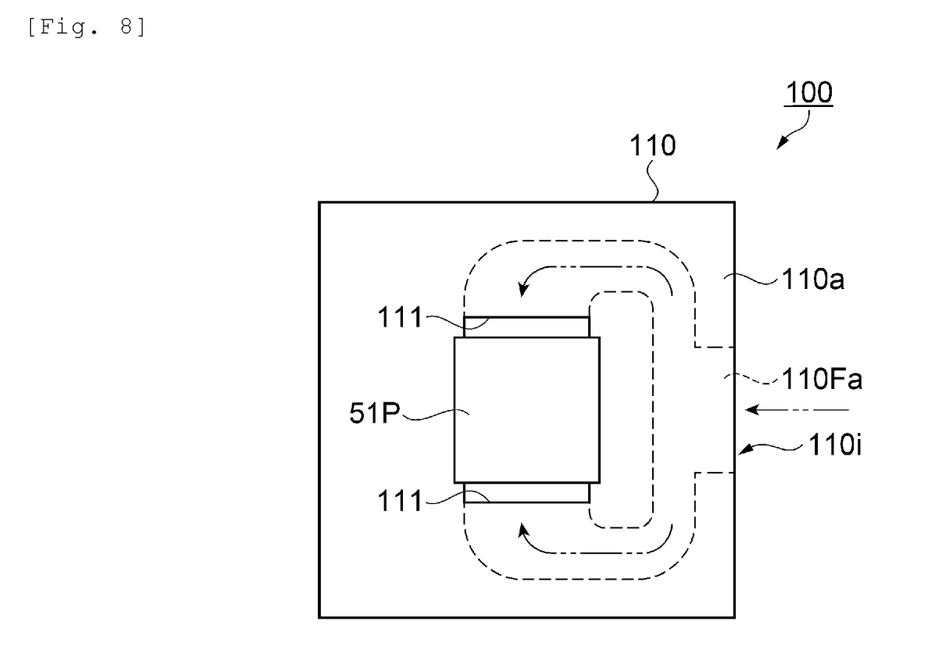
FIG. 8 is a schematic diagram of a wavelength conversion element showing an example of a modification.

FIG. 8 is a schematic diagram of a wavelength conversion element 100 showing an example of this modification.

As shown in FIG. 8, the wavelength conversion element 100 includes a base material 110. Opening sections 111 functioning as the first opening sections are provided on both sides via the phosphor layer 51P on a first surface 110a that holds the phosphor layer 51P. An inflow port 110i of air of a channel 110Fa that causes the two opening sections 111 and the outside of the wavelength conversion device to communicate is provided at one end of the base material 110. After extending from the inflow port 110i toward the phosphor layer 51P, the channel 110Fa branches into two to separate from each other. The respective branched channels extend to the two opening sections 111.

Even with such a configuration, it is possible to cause the air to flow out from the two opening sections 111 with the air flowing in from one inflow port 110i and cool the phosphor layer 51P as in the first embodiment.

Modification 4

In the second embodiment, one first opening section (the opening section 821) and one second opening section (the opening section 822) are provided. However, pluralities of the first opening sections and the second opening sections may be provided.

The wavelength conversion device including the first opening section and the second opening section may not include the sealing structure (the annular member 9 in the second embodiment).

Modification 5

In the embodiments, the phosphor layer 51P is configured to be disposed on the first members 61 and 81. However, the phosphor layer 51P may be configured to be disposed on the second member. That is, a second member including opening sections in a part where the phosphor layer 51P can be disposed and a position separated from the part may be configured.

Modification 6

The base materials 6 and 8 in the embodiments include two members (the first members 61 and 81 and the second members 62 and 82). The two members are stacked, whereby the base materials 6 and 8 including the channels are formed. However, channels may be formed by machining from an integral member.

Modification 7

The wavelength conversion devices 5 and 7 in the embodiments include the heat sink 52 separate from the base materials 6 and 8. However, a base material having a shape for improving a heat radiation property may be configured. A wavelength conversion device not including a heat sink separate from the base material may be configured.

Modification 8

In the second embodiment, the air is blown to the inflow port 8i by the blowing fan 41 of the cooling device 4. However, a cooling device including a fan that sucks the air from the outflow port 8e instead of the blowing fan 41 may be configured. In this configuration as well, it is possible to cause the air to flow in from the inflow port 8i, circulate the air in the region 7T in the same flow of the air as the flow explained in the second embodiment, and cause the air to flow out from the outflow port 8e.

Modification 9

The base materials 6 and 8 in the embodiments are not limited to the rectangular shape in plan view and may have a polygonal shape or a circular shape.

Modification 10

In the projector 1 in the embodiments, the liquid crystal panels of a transmission type are used as the light modulation devices 34. However, liquid crystal panels of a reflection type may be used. Light modulation devices of a micromirror type, for example, DMD (Digital Micromirror Devices) may be used as the light modulation devise.

Modification 11

The light modulation devices 34 in the embodiments adopt a so-called three-plate system in which the three light modulation devices 34R, 34G, and 34B are used. However, the light modulation devices 34 are not limited to this and may adopt a single-plate system. Alternatively, the light modulation devices 34 can also be applied to a projector including two or four or more light modulation devices.

Note that, in the embodiments, the air functioning as a coolant flowing in the channels 6Fa, 8Fa, 8Fb, and the like may be gas other than the air.

REFERENCE SIGNS LIST

The entire disclosure of Japanese Patent Application No. 2016-190773, filed on Sep. 29, 2016 is expressly incorporated by reference herein.

What is claimed is:

1. A wavelength conversion device including a wavelength conversion layer that is excited by excitation light to thereby emit light in a wavelength band different from a wavelength band of the excitation light, the wavelength conversion device comprising:
   a base material that includes a first surface and a side outer surface and holds the wavelength conversion layer on the first surface, the first surface intersecting with the side outer surface; and
   a light transmitting member disposed to be opposed to the wavelength conversion layer, wherein
   an opening section juxtaposed with the wavelength conversion layer is provided in the first surface,
   a side opening is provided at the side outer surface of the base material,
   a channel that causes the opening section and an outside of the wavelength conversion device to communicate is embedded in the base material, the channel penetrating the base material from the opening section to the side opening, and
   the light transmitting member includes an opposed surface opposed to the wavelength conversion layer and the opening section.

2. The wavelength conversion device according to claim 1, wherein the light transmitting member is a lens, the opposed surface of which is formed as a concave surface.

3. A light source device comprising:
   a light source that emits excitation light; and
   the wavelength conversion device according to claim 2 on which the excitation light is made incident.

4. A projector comprising:
   the light source device according to claim 3;
   a light modulation device that modulates, according to image information, light emitted from the light source device and generates image light;
   a projection optical device that projects the image light; and
   a blowing device that blows air to the wavelength conversion device.

5. The wavelength conversion device according to claim 1, wherein
   the opening section includes first opening sections from which air flows out, and
   the first opening sections are provided on both sides via the wavelength conversion layer.

6. The wavelength conversion device according to claim 5, wherein the opening section includes a second opening section into which air flows.

7. The wavelength conversion device according to claim 6, comprising an annular member disposed between the first surface and the light transmitting member and surrounding the first opening sections, the second opening section, and the wavelength conversion layer, and
   the annular member is in close contact with the first surface and the light transmitting member.

8. A light source device comprising:
   a light source that emits excitation light; and
   the wavelength conversion device according to claim 7 on which the excitation light is made incident.

9. A projector comprising:
   the light source device according to claim 8;
   a light modulation device that modulates, according to image information, light emitted from the light source device and generates image light;
   a projection optical device that projects the image light; and
   a blowing device that blows air to the wavelength conversion device.

10. A light source device comprising:
    a light source that emits excitation light; and the wavelength conversion device according to claim 6 on which the excitation light is made incident.

11. A projector comprising:

the light source device according to claim 10;

a light modulation device that modulates, according to image information, light emitted from the light source device and generates image light;

a projection optical device that projects the image light; and a blowing device that blows air to the wavelength conversion device.

12. A light source device comprising:

a light source that emits excitation light; and the wavelength conversion device according to claim 5 on which the excitation light is made incident.

13. A projector comprising:

the light source device according to claim 12;

a light modulation device that modulates, according to image information, light emitted from the light source device and generates image light;

a projection optical device that projects the image light; and a blowing device that blows air to the wavelength conversion device.

14. The wavelength conversion device according to claim 1, wherein the base material includes:

a first member that includes the first surface and holds the wavelength conversion layer on the first surface; and a second member that includes the first surface and is provided on the wavelength conversion layer side with respect to the first member, a recessed section forming the channel is formed in the first member by providing the second member on the first member, and the opening section is formed by providing the second member on the first member.

15. A light source device comprising:

a light source that emits excitation light; and the wavelength conversion device according to claim 14 on which the excitation light is made incident.

16. A projector comprising:

the light source device according to claim 15;

a light modulation device that modulates, according to image information, light emitted from the light source device and generates image light;

a projection optical device that projects the image light; and a blowing device that blows air to the wavelength conversion device.

17. A light source device comprising:

a light source that emits excitation light; and the wavelength conversion device according to claim 1 on which the excitation light is made incident.

18. A projector comprising:

the light source device according to claim 17;

a light modulation device that modulates, according to image information, light emitted from the light source device and generates image light;

a projection optical device that projects the image light; and a blowing device that blows air to the wavelength conversion device.

* * * * *